Jan. 29, 1963 R. K. McCANDLISS 3,075,619
VIBRATION SUPPRESSOR
Filed Feb. 6, 1961 2 Sheets-Sheet 1

INVENTOR.
ROBERT K. McCANDLISS
BY
Brumbaugh, Free, Graves & Donohue
ATTORNEYS

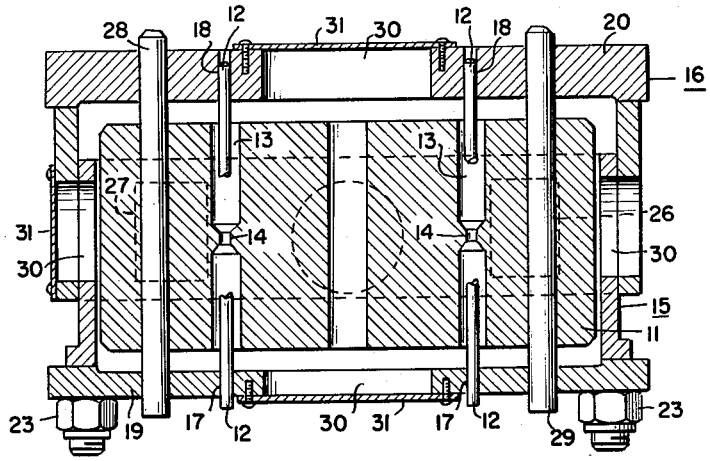
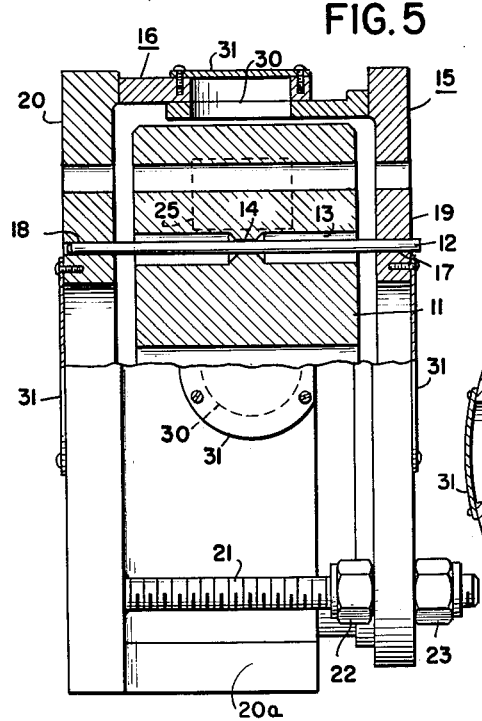
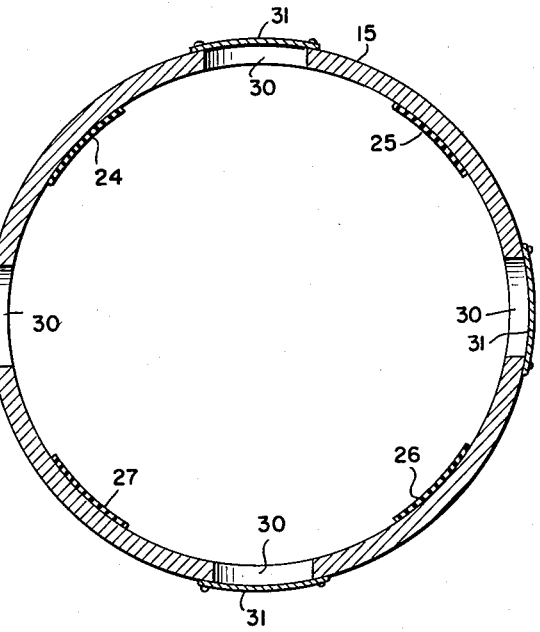
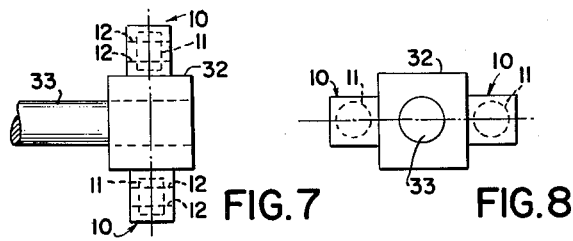

United States Patent Office 3,075,619
Patented Jan. 29, 1963

3,075,619
VIBRATION SUPPRESSOR
Robert K. McCandliss, Old Lyme, Conn., assignor to General Dynamics Corporation, New York, N.Y., a corporation of Delaware
Filed Feb. 6, 1961, Ser. No. 87,180
6 Claims. (Cl. 188—1)

This invention relates to apparatus for the suppression or dampening of vibrations, and more particularly, to apparatus for suppressing vibrations of a particular frequency occurring in any direction in a predetermined plane.

In the design of vibration suppressing apparatus, much attention has been directed toward producing devices suitable for application over a wide range of vibration frequencies. While generally useful throughout this entire range, such devices usually do not entirely dampen vibrations occurring at any one particular frequency within the range.

Totally suppressing vibrations at a particular frequency, however, is oftentimes very desirable. Taking as an example submarine applications, when a submarine is attempting to move unnoticed through the sea it is necessary to suppress as completely as possible the vibrations set up by machinery operating at speeds corresponding to the particular cruising speed of the submarine. Since a "quiet cruising" speed may be preestablished beforehand and rigidly adhered to, it may be appreciated that a vibration dampener extremely effective at a critical frequency is required for submarine applications rather than a dampener only partially effective over a wide range of frequencies.

In the present invention, attention is directed toward providing a vibration dampener that is extremely effective at a given fixed frequency, yet, which is capable of easy adjustment so that the fixed frequency may be selected from one of a number of frequencies. Further attention is directed toward suppressing vibrations in any direction lying in a predetermined plane, thus not limiting the dampening to a single direction as most vibration dampeners in general are limited.

The present invention achieves these ends with a vibration dampener that comprises a mass flexibly supported by rod means for oscillation in any direction lying in a given plane. In the preferred embodiment of the invention, the vibration suppressor comprises a disc-shaped mass having parallel spaced openings or holes extending therethrough. Flexible rods are passed through the holes and supported at the ends thereof by a pair of support plates. Each of the rods thus acts as a spring member, and the vibration dampening oscillation of the mass, caused by vibrations transmitted to the support plates, takes place in any direction along a plane lying perpendicular to the longitudinal axes of the rods. The natural period of oscillation of the supported mass may be varied by varying either the spacing between the support plates, the number of rods used, or the diameter or material of the rods.

A vibration suppressor as outlined above may be positioned against a bearing surface, for example, in order to suppress radial vibrations transmitted from a rotating shaft to the bearing. As many suppressors as desired in any installation may be used, placed so that the longitudinal axes of the rods are parallel to the longitudinal axis of the shaft. If two suppressors are employed, for example, they are preferably spaced 180° apart on the bearing surface. As may be seen, any placement of the vibration dampener may be utilized to suppress vibrations of any nature in any direction in a given plane.

Although the invention has been described in general terms above, a better understanding of it may be obtained by consulting the following detailed description, when taken in conjunction with the appended drawings, in which:

FIG. 4 is a sectional view of the vibration suppressor taken along the view line 4—4 of FIG. 2 looking in the direction of the arrows;

FIG. 5 is a side view of the vibration suppressor partly in section, taken along the line 5—5 of FIG. 3 looking in the direction of the arrows;

FIG. 6 is a sectional view of a portion of the structure of FIG. 1 taken along the line 6—6 of that figure looking in the direction of the arrows; and FIGS. 7 and 8 diagrammatically illustrate a typical use of vibration suppressors in accordance with the invention to dampen bearing vibrations.

Figure 1:
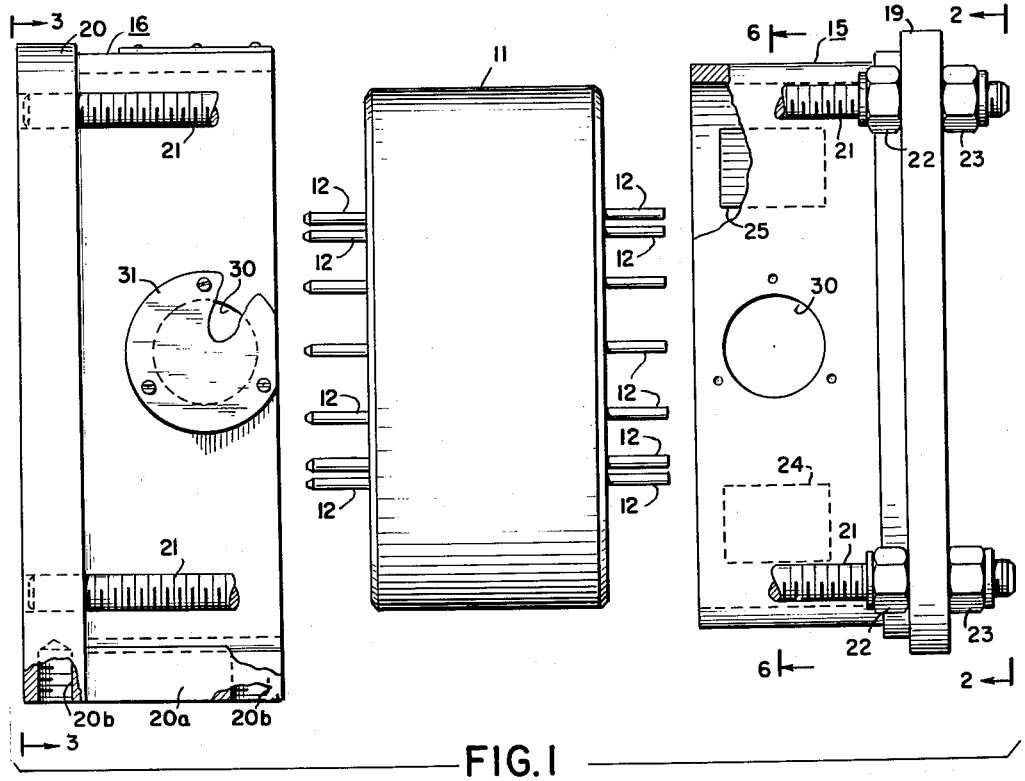
FIG. 1 is an exploded plan view of a vibration suppressor in accordance with the present invention.
Figures 2, 3:
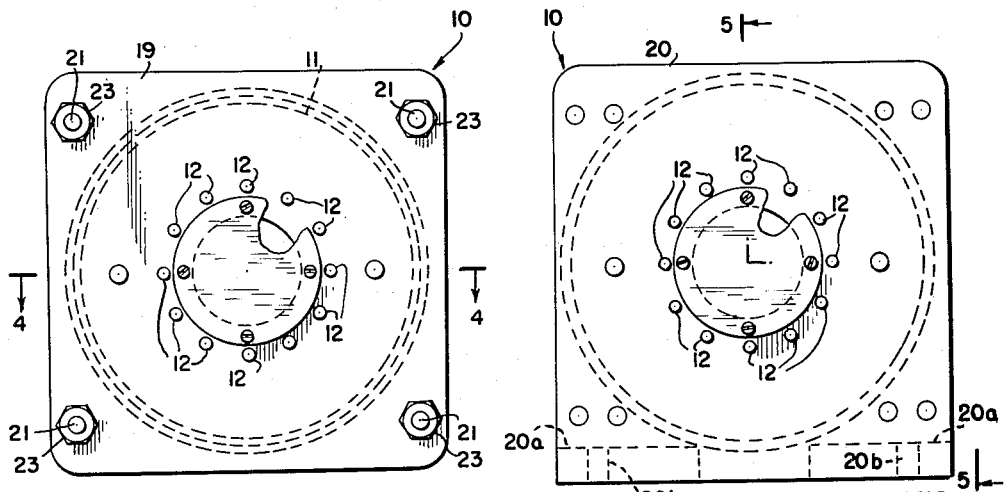
FIG. 2 shows one end of the structure of FIG. 1 viewed in a direction perpendicular to the line 2—2 of FIG. 1 looking in the direction of the arrows.
FIG. 3 shows the other end of the structure of FIG. 1 viewed in a direction perpendicular to the line 3—3 of FIG. 1 looking in the direction of the arrows.

Referring to a typical embodiment of the invention in greater detail, a vibration suppressor 10 is formed by a disc-shaped mass 11 shown in FIG. 1, with a plurality of flexible rods 12 extending therethrough parallel to its axis. As shown in FIGS. 4 and 5, each of the rods 12 passes through an associated hole 13, drilled through the mass 11, and is held in position by a shoulder 14 in the midportion of each hole 13 that supports the midportion of the corresponding rod.

The placement of the mass 11 within a housing formed by two cylindrically shaped members 15 and 16 is shown best in FIGS. 1, 4 and 5. Each of the rods 12 extending through the mass is forced into and supported at its two ends by drilled portions 17 and 18 in end plates 19 and 20 of the members 15 and 16, respectively. The two end plates are spaced by a series of bolts 21 that are welded or otherwise suitably attached to the end plate 20. The bolts are passed through corresponding holes in the end plate 19, and a pair of nuts 22 and 23, threaded on each bolt 21 and positioned on opposite sides of the end plate 19, serve to dictate the spacing between the end plates 19 and 20.

Base plates 20a (FIG. 1) welded to the end plate 20 aid in supporting the suppressor 10 on vibrating structures. Holes 20b and other holes, if desired, are provided in the end plates 20 and base plates 20a to aid in attaching the suppressors 10 to vibrating structures.

If vibrated excessively, the mass 11 engages a series of cushions 24 to 27 (FIG. 6), spaced along the inner surface of the member 15, to reduce impact stresses and noise.

To aid in the assembly of the vibration suppressor, guide rods 28 and 29 (FIG. 4) are utilized to assemble the suppressor 10 with the mass 11 properly positioned within its enclosure, and then are removed. A series of holes, designated as 30 in FIGS. 1, 4, 5 and 6, are drilled through the members 15 and 16 to position jigs (not shown) that aid in the assembly of the device. Such holes may thereafter be closed by dust covers 31, if desired.

In fabricating a vibration suppressor in accordance with the principles of the invention, the following should be noted. First, the weight of the mass 11 should be sufficient to dampen the particular vibrations encountered. Second, the diameter of the rods 12, their constituent material, both of which determine their flexibility, and the number of rods employed, all affect the natural period of oscillation of the mass. Third, for a particular group of rods, the natural period may be finely adjusted by varying the spacing between the end plates 19 and 20.

To dampen radial vibrations produced in a bearing 32 (FIGS. 7 and 8) by a rotating shaft 33, a pair of the vibration suppressors 10 are fastened to the bearing 32 by bolts extending through the mounting holes 20b. Using two suppressors, it is preferable to space them 180° from each other with respect to the shaft 33 with the centroids of the masses 11 lying on a line passing perpendicularly through the axis of the shaft 33 and in a plane through the center of the bearing. Three, four, or more suppressors spaced suitably on the bearing around the shaft may also be used. To dampen radial vibrations, the flexible rods 12 should be parallel to the shaft axis.

Prior to attaching the suppressors 10 to the bearing 32, their natural periods of oscillation should be adjusted to the vibrating period of the bearing 32 which depends, of course, on the speed of shaft rotation. Subsequent to attachment of the suppressors 10 to the bearing 32, the spacing of the end plates 19 and 20 is suitably adjusted, if necessary, to match the natural periods of the suppressors 10 more closely to the bearing vibrations.

With the suppressors 10 attached as shown in FIGS. 7 and 8, oscillation of the masses 11 in the plane perpendicular to the rods 12 will effectively dampen the vibrations of the bearing 32.

From the detailed description of the invention given above it is apparent that numerous additions, substitutions, and modifications of the embodiment described may be made. Such alterations, however, should be deemed to be well within the scope of the following claims which define the invention.

I claim:

1. A vibration suppressor comprising a mass, a plurality of parallel spaced openings extending through the mass, a plurality of flexible rods supporting the mass each one of which extends through a different one of said openings, and a pair of support plates, portions of the rods extending from each side of the mass being supported by the plates to enable oscillation of the mass in a plane perpendicular to the rods.

2. A vibration suppressor comprising a mass, flexible rod means extending from each side of the mass, support means including a pair of end plates supporting the rod means to enable oscillation of the mass in a plane perpendicular to the rod means, and means for varying the spacing between the end plates to vary the natural period of oscillation of said mass.

3. A vibration suppressor comprising a mass, a plurality of parallel openings extending through the mass, a plurality of flexible rods supporting the mass each one of which extends through a different one of said openings, support means including a pair of end plates supporting the rod ends to enable oscillation of the mass in a plane perpendicular to the rods, and means for varying the spacing between the end plates to vary the natural period of oscillation of said mass.

4. A vibration suppressor as defined in claim 3, in which a shoulder is provided at the mid-portion of each one of the openings to support the rod passing therethrough.

5. A vibration suppressor comprising a mass, a plurality of parallel openings extending through the mass, a plurality of flexible rods supporting the mass each one of which extends through a different one of said openings, a housing for the mass including a pair of end plates having openings therethrough for receiving and supporting the rods and permitting simple changes in the number of rods used to support the mass and allowing rods of one material to be substituted for rods of another material, and means to vary the spacing between the end plates, whereby the natural period of oscillation of the mass in a plane perpendicular to the rods may be varied.

6. A vibration suppressor as defined in claim 5, in which a shoulder is provided at the mid-portion of each one of the openings in the mass to support the rod passing therethrough.

References Cited in the file of this patent

UNITED STATES PATENTS

| 1,855,570 | Edison | Apr. 26, 1932 |
| 2,534,963 | Fowler | Dec. 19, 1950 |
| 2,736,393 | O'Connor | Feb. 28, 1956 |
| 2,796,149 | Wallin | June 18, 1957 |

FOREIGN PATENTS

| 763,753 | Great Britain | Dec. 19, 1956 |